US010526925B2

(12) United States Patent
Bak et al.

(10) Patent No.: US 10,526,925 B2
(45) Date of Patent: Jan. 7, 2020

(54) SUPERCRITICAL $CO_2$ GENERATION SYSTEM FOR SERIES RECUPERATIVE TYPE

(71) Applicant: DOOSAN HEAVY INDUSTRIES & CONSTRUCTION CO., LTD, Changwon-si, Gyeongsangnam-do (KR)

(72) Inventors: Byoung Gu Bak, Pohang-si (KR); Seung Gyu Kang, Yongin-si (KR); Jeong Ho Hwang, Yongin-si (KR); Eung Chan Lee, Seoul (KR); Cheol Rae Jeong, Incheon (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 91 days.

(21) Appl. No.: 15/698,475

(22) Filed: Sep. 7, 2017

(65) Prior Publication Data
US 2018/0156075 A1  Jun. 7, 2018

(30) Foreign Application Priority Data

Dec. 6, 2016  (KR) .................. 10-2016-0165316

(51) Int. Cl.
F01K 25/10 (2006.01)
F02C 1/10 (2006.01)
(Continued)

(52) U.S. Cl.
CPC ............ F01K 25/103 (2013.01); F01K 7/32 (2013.01); F01K 25/10 (2013.01); F02C 1/10 (2013.01); F02C 6/003 (2013.01)

(58) Field of Classification Search
CPC .......... F01K 7/32; F01K 25/10; F01K 25/103
(Continued)

(56) References Cited

U.S. PATENT DOCUMENTS 7,096,665 B2 *  8/2006  Stinger ................... F01K 25/08
                                                        60/651
9,624,793 B1 *  4/2017  Pasch ....................... F01K 7/16
(Continued)

FOREIGN PATENT DOCUMENTS

JP   2011256818 A   12/2011
JP   2012-145092 A   8/2012

OTHER PUBLICATIONS

Kimzey, G., "Development of a Brayton Bottoming Cycle using Supercritical Carbon Dioxide as the Working Fluid", Electric Power Research Institute Report, Palo Alto, CA (2012), pp. 1-31.
(Continued)

Primary Examiner — Laert Dounis
(74) Attorney, Agent, or Firm — Invenstone Patent, LLC

(57) ABSTRACT

The present invention relates to a supercritical $CO_2$ power generation system of a series recuperative type. According to an embodiment of the present invention, an inlet temperature of a turbine can be increased to increase a work of the turbine, thereby realizing a cycle design having improved turbine efficiency. Further, the number and diameter of pipes connected to a heat exchanger using an external heat source can be reduced to reduce the plumbing related costs, thereby improving economical efficiency.

12 Claims, 7 Drawing Sheets

(51) Int. Cl.
*F02C 6/00* (2006.01)
*F01K 7/32* (2006.01)

(58) Field of Classification Search
USPC .......................................... 60/647, 651, 671
See application file for complete search history.

(56) References Cited

U.S. PATENT DOCUMENTS

| | | | | |
|---|---|---|---|---|
| 2012/0047892 A1* | 3/2012 | Held | ....................... | F01K 3/185 60/652 |
| 2012/0131921 A1* | 5/2012 | Held | ....................... | F01K 25/08 60/671 |
| 2014/0000261 A1* | 1/2014 | Freund | ................. | F01K 25/103 60/671 |
| 2014/0102101 A1* | 4/2014 | Xie | ....................... | F01K 25/103 60/647 |
| 2015/0240665 A1* | 8/2015 | Stapp | ....................... | F01K 3/18 60/647 |
| 2016/0010512 A1* | 1/2016 | Close | ...................... | F01K 11/04 60/651 |
| 2016/0326916 A1* | 11/2016 | Roh | .......................... | F02C 1/08 |
| 2017/0107860 A1* | 4/2017 | Kim | .......................... | F01K 7/16 |
| 2017/0114673 A1* | 4/2017 | Kim | .......................... | F01K 13/00 |
| 2017/0234169 A1* | 8/2017 | Kim | .......................... | F01K 7/16 60/671 |
| 2017/0234170 A1* | 8/2017 | Kim | .......................... | F01K 7/16 60/671 |
| 2017/0234266 A1* | 8/2017 | Hwang | ..................... | F01K 7/16 60/645 |
| 2018/0142581 A1* | 5/2018 | Jeong | ................... | F01K 25/103 |

OTHER PUBLICATIONS

Kimzey, G., "Supercritical CO2 Brayton Cycles and Their Application as a Bottoming Cycle," Project Summary Webcast, Sep. 7, 2017, Electric Power Research Institute.

Korean Office Action issued by the Korean Intellectual Property Office dated Jul. 20, 2017 in connection with Korean patent application No. 10-2016-0165316.

* cited by examiner

Prior Art

SUPERCRITICAL $CO_2$ GENERATION SYSTEM FOR SERIES RECUPERATIVE TYPE

CROSS-REFERENCE TO RELATED APPLICATION

This application claims priority to Korean Patent Application No. 10-2016-0165316, filed on Dec. 6, 2016, the disclosure of which is incorporated herein by reference in its entirety.

BACKGROUND

Exemplary embodiments of the present invention relate to a supercritical $CO_2$ generation system for a series recuperative type, and more particularly, to a supercritical $CO_2$ generation system for a parallel recuperative type capable of improving turbine efficiency and saving plumbing costs.

Internationally, as a necessity for efficient power production is increasing more and more and a movement to reduce pollutant emissions is becoming more and more active, various efforts to increase power production while reducing the occurrence of pollutants have been conducted. As one of the efforts, research and development into a power generation system using supercritical $CO_2$ as a working fluid as disclosed in Japanese Patent Laid-Open Publication No. 2012-145092, for example, has been actively conducted.

The supercritical $CO_2$ has a density similar to a liquid state and viscosity similar to gas, such that equipment may be miniaturized and power consumption required to compress and circulate the fluid may be minimized. At the same time, the supercritical $CO_2$ having critical points of 31.4° C. and 72.8 atm is much lower than water having critical points of 373.95° C. and 217.7 atm, and thus may be handled very easily. The supercritical $CO_2$ generation system shows pure generation efficiency of about 45% when being operated at 550° C. and may improve generation efficiency by 20% or more as compared to that of the existing steam cycle and reduce the size of a turbo device.

FIG. 1 is a schematic diagram showing the existing Electronic Power Research Institute (EPRI) proposed cycle.

According to the EPRI proposed cycle of FIG. 1, two turbines 400 are provided and a work of the turbines 400 is transmitted to the compressor 100. The compressor 100 is driven by the work of the turbines to compress a working fluid. The work of the turbines transmitted to the compressor 100 is transmitted to an output corresponding to an output frequency of the generator (not shown) through the gear box (not shown) and transmitted to the generator. A recuperator 200 and heat exchanger 300 using an external heat source, such as waste heat or the like, are provided in plural, and the plurality of recuperators 200 and heat exchangers 300 are arranged in series.

The supercritical $CO_2$ working fluid compressed by the compressor 100 is branched from the first separator S1, and some thereof is transmitted to a low temperature heater 330 and some thereof is transmitted to a low temperature recuperator 230. A working fluid heated by a low temperature heater 330 is transmitted to a first mixer M1. The working fluid transmitted to the low temperature recuperator 230 which exchanges heat with the working fluid transmitted to a pre-cooler 500 is primarily heated and then transmitted to the first mixer M1. The working fluid mixed by the first mixer M1 is transmitted to a second separator S2 where the working fluid is branched and transmitted to a high temperature heater 310 and to a high temperature recuperator 210.

The working fluid transmitted to the high temperature heater 310 is transmitted to a first turbine 410 to drive the first turbine 410 and the working fluid transmitted to the high temperature recuperator 210 that exchanges heat with the working fluid passing through the first turbine 410 is heated and then transmitted to a second turbine 430 to drive the second turbine 430.

The working fluid that is heat-exchanged by the high temperature recuperator 210 through the first turbine 410 and then primarily cooled is transmitted to a second mixer M2, and is mixed with the working fluid passing through a second turbine 430 by the second mixer M2 and transmitted to the low temperature recuperator 230. The working fluid transmitted to the low temperature recuperator 230 exchanges heat with the working fluid branched from the first separator S1 to be secondarily cooled, then transmitted to the pre-cooler 500 to be re-cooled, and then transmitted to the compressor 100.

In the case of the EPRI proposed cycle described above, since the working fluid is introduced by being branched from front ends of the high temperature recuperator 210 and the high temperature heater 310, temperature of transfer pipes 10 and 15 is the same all the times. Therefore, there is a limitation in designing a cycle in which the inlet temperatures of the first turbine 410 and the second turbine 430 are increased to increase a work of the turbine.

Further, there are four transfer pipes 1, 8, 9, and 10 connected to the heat exchanger 300 using an external heat source, which makes it difficult to secure economical efficiency due to the increase in plumbing costs. In addition, since the flow rate of the working fluid mixed by the first mixer M1 is equal to the flow rate of the entire cycle, the first mixer M1 and the pipes before and after the first mixer M1 are relatively large, which leads to increase the plumbing costs.

SUMMARY

A supercritical $CO_2$ generation system for a series recuperative type capable of improving turbine efficiency and saving plumbing costs is described. Other advantages can be understood by the following description, and become apparent with reference to the exemplary embodiments disclosed and can be realized by what is claimed and combinations thereof.

In accordance with one aspect, a supercritical $CO_2$ generation system of a series recuperative type includes a compressor compressing a working fluid, a plurality of heat exchangers being supplied heat from an external heat source to heat the working fluid, a plurality of turbines driven by the working fluid, a plurality of recuperators exchanging heat between the working fluid passing through the turbine and the working fluid passing through the compressor to cool the working fluid passing through the turbine and installed in series, and a pre-cooler cooling the working fluid primarily cooled by the recuperator and supplying the cooled working fluid to the compressor, in which temperatures of the working fluids introduced into the plurality of turbines may be different from each other.

The working fluid passing through the compressor may be branched to a cold side heat exchanger among the heat exchangers and a cold side recuperator among the recuperators from a rear end of the compressor, respectively.

The working fluid branched to the cold side recuperator may be heated via the cold side recuperator and then branched to a hot side recuperator among the recuperators and a hot side heat exchanger among the heat exchangers.

The working fluid branched to the hot side heat exchanger may be mixed with the working fluid heated by the cold side heat exchanger to be supplied to the hot side heat exchanger and reheated, and may be then supplied to the hot side turbine among the turbines.

The working fluid branched to the hot side recuperator may be heated via the hot side recuperator and then supplied to the cold side turbine among the turbines.

A flow rate of the working fluid supplied to the hot side turbine via the hot side heat exchanger may be set to be larger than that of the working fluid supplied to the cold side turbine via the hot side recuperator.

The working fluid supplied to the hot side turbine may be transmitted to the hot side recuperator after the hot side turbine is driven and exchange heat with the working fluid supplied to the hot side recuperator via the compressor to be primarily cooled.

The working fluid cooled by the hot side recuperator may be mixed with the working fluid via the cold side turbine to be supplied to the cold side recuperator.

The working fluid supplied to the cold side recuperator via the hot side recuperator may exchange heat with the working fluid via the compressor to be secondarily cooled, and the working fluid cooled by the cold side recuperator may be supplied to the pre-cooler.

The flow rate of the working fluid supplied to the hot side turbine via the hot side heat exchanger may be 50% to 60% of a total flow rate of the working fluid passing through the compressor.

In accordance with another aspect, a supercritical $CO_2$ generation system of a series recuperative type includes a compressor compressing a working fluid, a high temperature heater and a low temperature heater supplied heat from an external heat source to heat the working fluid, a high temperature turbine and a low temperature turbine driven by the working fluid, a plurality of recuperators exchanging heat between the working fluid passing through the high temperature turbine and the low temperature turbine and the working fluid passing through the compressor to cool the working fluid passing through the high temperature turbine and the low temperature turbine and installed in series, and a pre-cooler cooling the working fluid primarily cooled by the recuperator and supplying the cooled working fluid to the compressor, in which the temperatures of the working fluids introduced into the high temperature turbine and the low temperature turbine may be different from each other.

The recuperator may include a high temperature recuperator and a low temperature recuperator, and the working fluid passing through the high temperature turbine may be cooled by sequentially passing through the high temperature recuperator and the low temperature recuperator and then supplied to the pre-cooler.

A rear end of the compressor may be provided with a first separator, and the working fluid passing through the compressor may be branched to the low temperature heater and the low temperature recuperator, respectively.

A rear end of the low temperature recuperator may be provided with a second separator, and the working fluid heated via the low temperature recuperator may be branched to the high temperature recuperator and the high temperature heater, respectively.

A rear end of the low temperature heater may be provided with a first mixer, and the working fluid branched to the low temperature heater may be primarily heated by the low temperature heater and may then be mixed with the working fluid via the low temperature recuperator by the first mixer.

The working fluid mixed by the first mixer may be reheated by the high temperature heater to be supplied to the high temperature turbine.

The working fluid branched from the second separator to the high temperature recuperator may be secondarily heated by the high temperature recuperator and then supplied to the low temperature turbine.

A second mixer may be provided between the high temperature recuperator and the low temperature recuperator, and the working fluid via the high temperature turbine may exchange heat with the working fluid via the second separator from the high temperature recuperator to be primarily cooled and then supplied to the second mixer.

The working fluid passing through the low temperature turbine may be mixed with the working fluid passing through the high temperature recuperator by the second mixer, may be supplied to the low temperature recuperator, and may exchange heat with the working fluid passing through the first separator to be secondarily cooled and may then be supplied to the pre-cooler.

A flow rate of the working fluid mixed by the first mixer to be supplied to the high temperature heater may be set to be larger than that of the working fluid branched to the high temperature recuperator and supplied to the low temperature turbine, and a flow rate of the working fluid supplied to the high temperature turbine may be 50% to 60% of a total flow rate of the working fluid passing through the compressor.

BRIEF DESCRIPTION OF THE DRAWINGS

The above and other objects, features and other advantages will be more clearly understood from the following detailed description taken in conjunction with the accompanying drawings, in which.

DETAILED DESCRIPTION

Hereinafter, a supercritical $CO_2$ generation system for a series recuperative type according to an exemplary embodiment will be described in detail with reference to the accompanying drawings.

Generally, the supercritical $CO_2$ generation system configures a closed cycle in which $CO_2$ used for power generation is not emitted to the outside, and uses supercritical $CO_2$ as a working fluid to construct a single phase generation system. The supercritical $CO_2$ generation system uses the $CO_2$ as the working fluid and therefore may use exhaust gas emitted from a thermal power plant, etc., such that it may be used in a single generation system and a hybrid generation system with the thermal generation system. The working fluid of the supercritical $CO_2$ generation system may also supply $CO_2$ separated from the exhaust gas and may also supply separate $CO_2$.

A working fluid in a cycle that is a supercritical $CO_2$ becomes a high temperature and high pressure working fluid while passing through a compressor and a heater to drive a turbine. The turbine is connected to a generator and the generator is driven by the turbine to produce power. Alternatively, the turbine and the compressor may be coaxially connected to each other, and then the compressor may be provided with a gear box or the like to be connected to the generator. The working fluid used to produce power is cooled while passing through heat exchangers such as a recuperator and a pre-cooler and the cooled working fluid is again supplied to the compressor and is circulated within the cycle. The turbine or the heat exchanger may be provided in plural.

The supercritical $CO_2$ generation system according to various exemplary embodiments refers to a system where all the working fluids flowing within the cycle are in the supercritical state as well as a system where most of the working fluids are in the supercritical state and the rest of the working fluids are in a subcritical state.

Further, in various exemplary embodiments, the $CO_2$ is used as the working fluid. Here, $CO_2$ refers to pure carbon dioxide in a chemical meaning as well as carbon dioxide including some impurities and even a fluid in which carbon dioxide is mixed with one or more fluids as additives in general terms.

Figure 2:
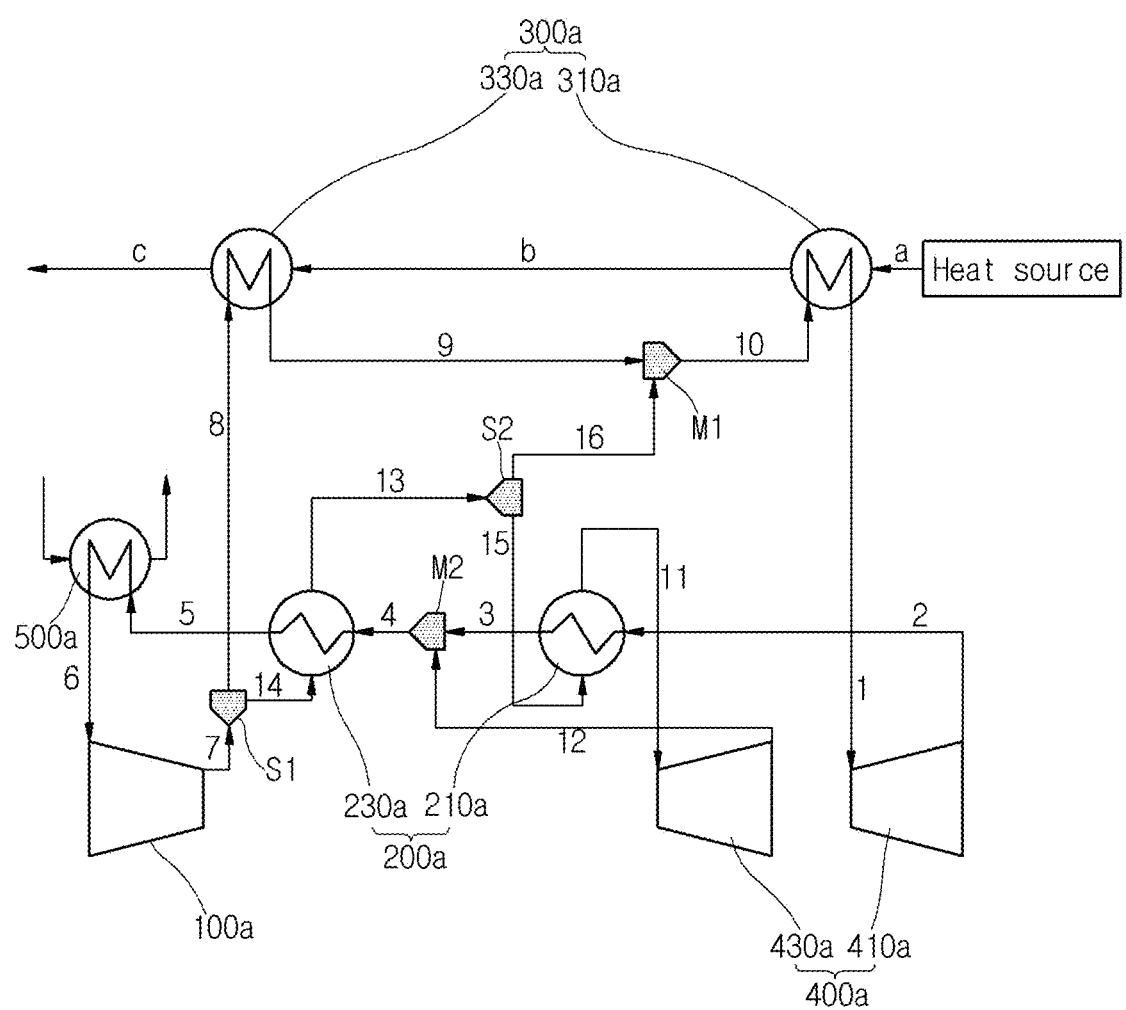
FIG. 2 is a schematic diagram showing a cycle of a supercritical $CO_2$ generation system for a series recuperative type according to an exemplary embodiment.

FIG. 2 is a schematic diagram showing a cycle of a supercritical $CO_2$ generation system for a series recuperative type according to an exemplary embodiment. Referring to FIG. 2, the generation cycle includes two turbines 410a and 430a (400a) for producing electric power, a pre-cooler 500a for cooling a working fluid, and a compressor 100a for increasing a pressure of the cooled working fluid, thereby forming high temperature and high pressure working fluid conditions. In addition, two waste heat recovery heat exchangers 300a (hereinafter, low temperature heater 330a and high temperature heater 310a) separated for effective waste heat recovery are provided and two recuperators 200a (hereinafter, low temperature recuperator 230a and high temperature recuperator 210a) for heat exchange of the working fluid are provided. The waste heat recovery heat exchanger 300a and the recuperator 200a are provided in series, and a plurality of separators and mixers for distributing a flow rate of the working fluid are provided.

A high temperature turbine 410a and the low temperature turbine 430a are driven by the working fluid. First, the high temperature and high pressure working fluid is supplied to the high temperature turbine 410a via transfer pipe 1. A mid-temperature and mid-pressure working fluid that drives the high temperature turbine 410a and is expanded is transmitted to the hot side of the high temperature recuperator 210a via transfer pipe 2 and exchanges heat with the working fluid passing through the compressor 100a and the low temperature recuperator 230a. A rear end of the recuperator 210a is provided with the second mixer M2 and the working fluid that is cooled after heat exchange is transmitted to the second mixer M2 via transfer pipe 3. The working fluid cooled by the high temperature recuperator 210a is mixed with the working fluid that is expanded by passing through the low temperature turbine 430a and has the reduced temperature by the second mixer M2 and is transmitted to the hot side of the low temperature recuperator 230a via transfer pipe 4. That is, the working fluid transmitted to the low temperature recuperator 230a becomes a sum of the working fluids passing through the high temperature turbine 410a and the low temperature turbine 430a. The working fluid once again cooled by the low temperature recuperator 230a is transmitted to the hot side of the pre-cooler 500a via transfer pipe 5. The working fluid cooled by the pre-cooler 500a is transmitted to the compressor 100a via transfer pipe 6.

The low temperature and high pressure working fluid having flow rate m that is cooled by the pre-cooler 500a and compressed by the compressor 100a is transmitted to the separator S1 provided at a rear end of the compressor 100a via transfer pipe 7. The working fluid is branched from the separator S1 to the low temperature heater 330a and the low temperature recuperator 230a, respectively, and branched through transfer pipes 8 and 14, respectively.

The low temperature heater 330a and the high temperature heater 310a are external heat exchangers that heat a working fluid using an external heat source of a cycle such as waste heat, and use gas, as a heat source (hereinafter, waste heat gas) having waste heat such as exhaust gas emitted from a boiler of a generator. The low temperature heater 330a and the high temperature heater 310a serve to exchange heat between the waste heat gas and the working fluid circulated within the cycle, thereby heating the working fluid with heat supplied from the waste heat gas. As the heat exchanger approaches the external heat source, the heat exchange is made at a higher temperature, and as the heat exchanger approaches an outlet end through which the waste heat gas is discharged, the heat exchange is made at a low temperature. The waste heat gas is introduced into the high temperature heater 310a from the high temperature heater via transfer pipe A, introduced into the low temperature heater 330a through the high temperature heater 310a via transfer pipe B, and then discharged to the outside through the low temperature heater 330a via transfer pipe C. Therefore, the high temperature heater 310a is a heat exchanger close to the external heat source, and the low temperature heater 330a is a heat exchanger far away from the external heat source and the high temperature heater 310a.

The working fluid having flow rate mf1 branched to the low temperature heater 330a exchanges heat with the waste heat gas to be primarily heated and is then transmitted to the first mixer M1 installed at the downstream end of the low temperature heater 330a via transfer pipe 9. A second separator S2 is installed between the low temperature recuperator 230a and the mixer M1. The working fluid, which has passed through low temperature recuperator 230a, is branched to the mixer M1 and the high temperature recuperator 210a. The working fluid, which is branched from a second separator after having passed through the low temperature recuperator 230a via the compressor 100a, is transmitted to the first mixer M1 in order to be supplied to the high temperature heater 310a. The flow rate of the working fluid mixed by the first mixer M1 corresponds to the flow rate m of the entire system, and the branched working fluid is supplied to the high temperature recuperator 210a via transfer pipe 15. In the second separator S2, the working fluid is branched to the mixer M1 via transfer pipe 16 and then transferred through the mixer M1 to the high temperature heater 310a via transfer pipe 10 and heated and then supplied to the high temperature turbine 410a via transfer pipe 1, and is branched even to the high temperature recuperator 210a via transfer pipe 15.

If the flow rate branched to the high temperature heater 310a is mf2, the flow rate of the working fluid branched to the high temperature recuperator 210a via the second separator S2 becomes m (1–f2). On the other hand, the working fluid branched to the high temperature recuperator 210a exchanges heat with the working fluid passing through the high pressure turbine 410a to be heated via transfer pipe 15, and is then transmitted to the low temperature turbine 430a via transfer pipe 11. The working fluid that drives the low temperature turbine 430a is transmitted to the second mixer M2 as described above via transfer pipe 12.

The flow rate mf2 of the working fluid supplied to the high temperature turbine 410a through the high temperature heater 310a is preferably set to be larger than the flow rate (m (1–f2)) of the working fluid supplied to the low temperature turbine 430a via the high temperature recuperator 210a. By the process, the working fluid is circulated within the cycle to drive the turbine and to generate the work of the turbine.

The difference between the existing cycle and the supercritical $CO_2$ generation system of a series recuperative type according to the exemplary embodiment having the above configuration will be described in detail as follows. In all cases, the inlet temperature of the high temperature turbine, the flow rate of the entire working fluid, and the heat capacity introduced from the external heat source are fixed as the same value.

Figure 1:
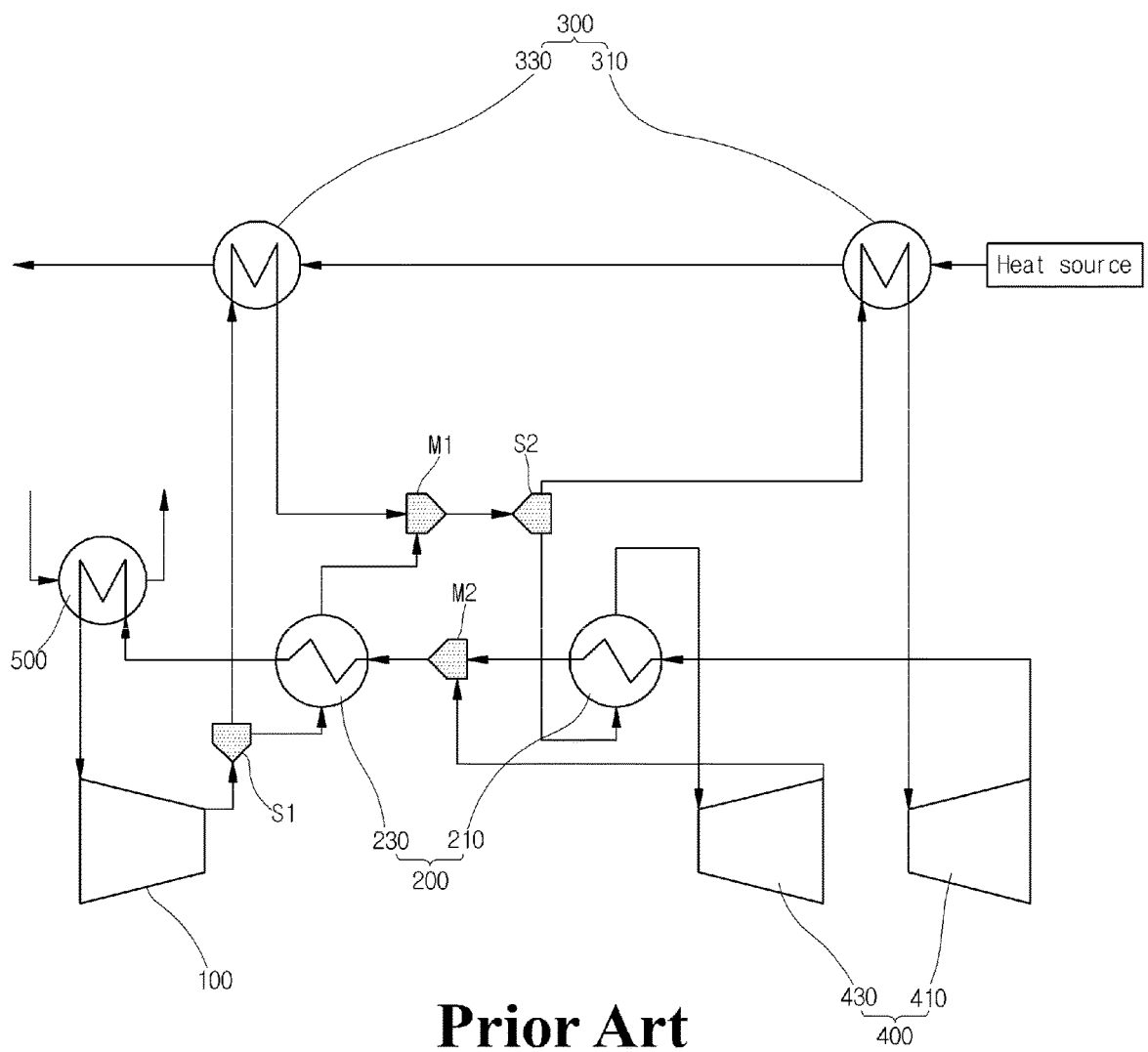
FIG. 1 is a schematic diagram showing the existing EPRI proposed cycle.
Figure 3:
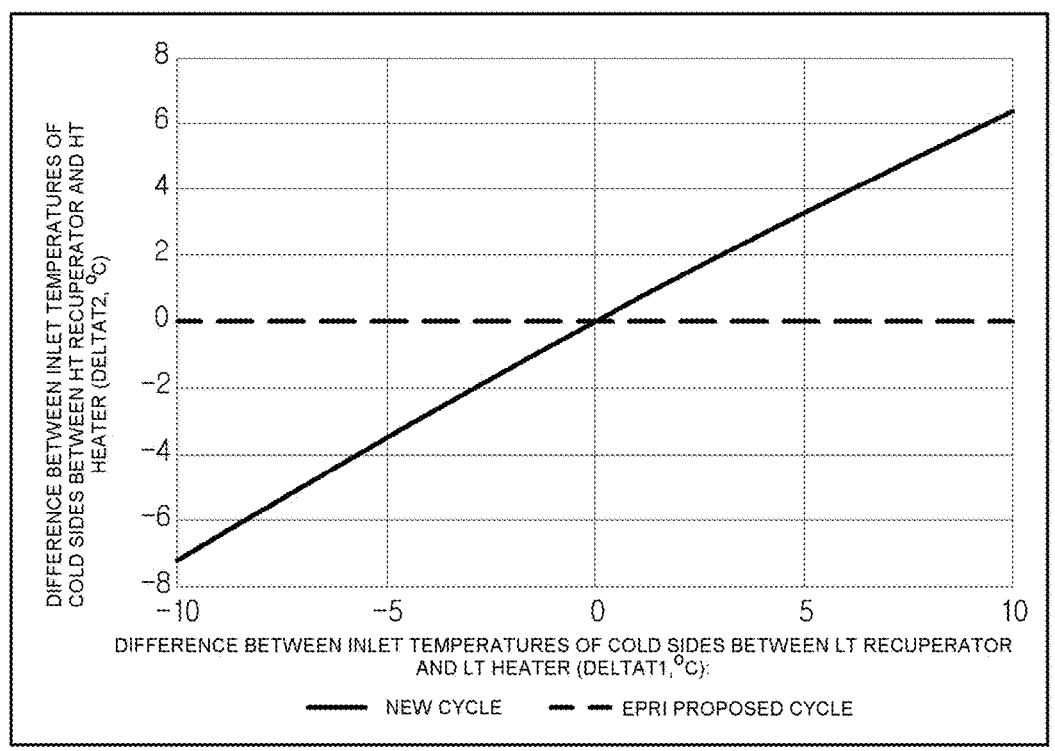
FIG. 3 is a comparison graph of temperature characteristics of a cycle of FIG. 1 and a cycle of FIG. 2.
Figure 4:
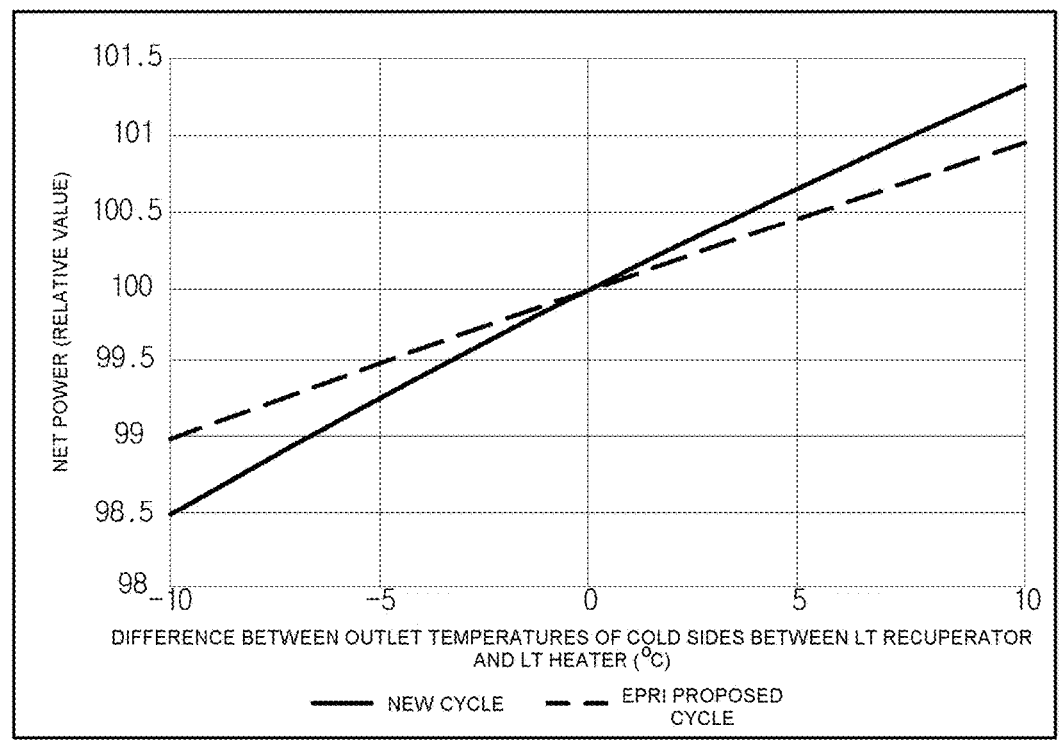
FIG. 4 is a comparison graph of net power of the cycle of FIG. 1 and the cycle of FIG. 2.
Figure 5:
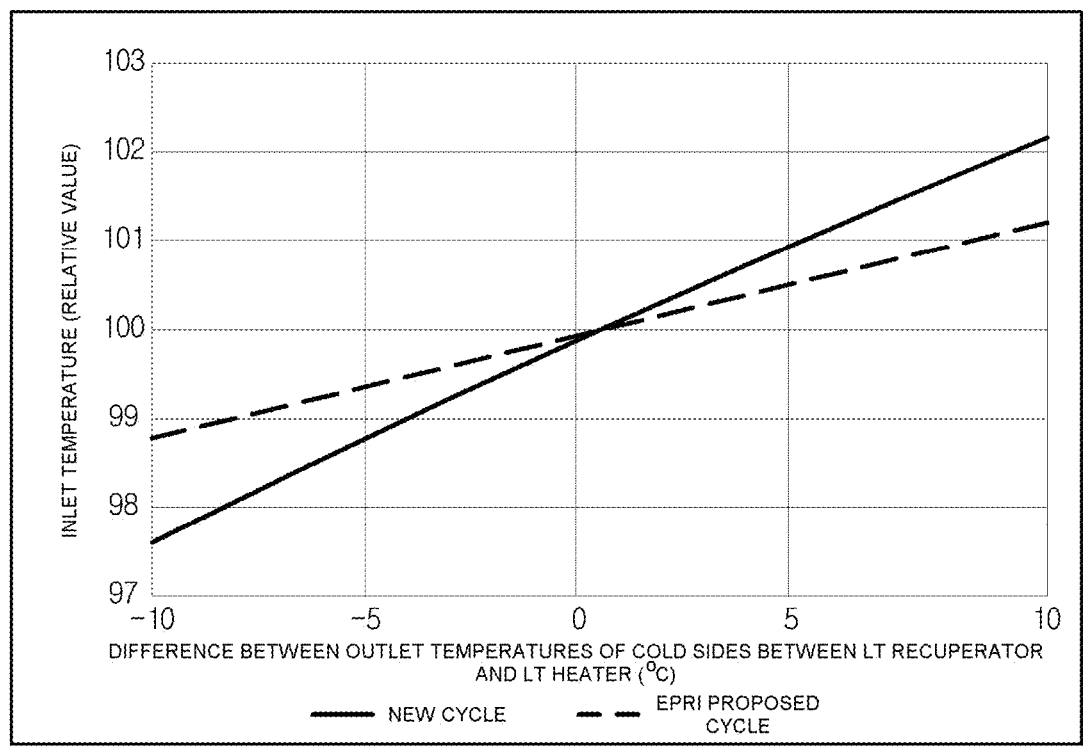
FIG. 5 is a comparison graph of inlet temperatures of low temperature turbines of the cycle of FIG. 1 and the cycle of FIG. 2.
Figure 6:
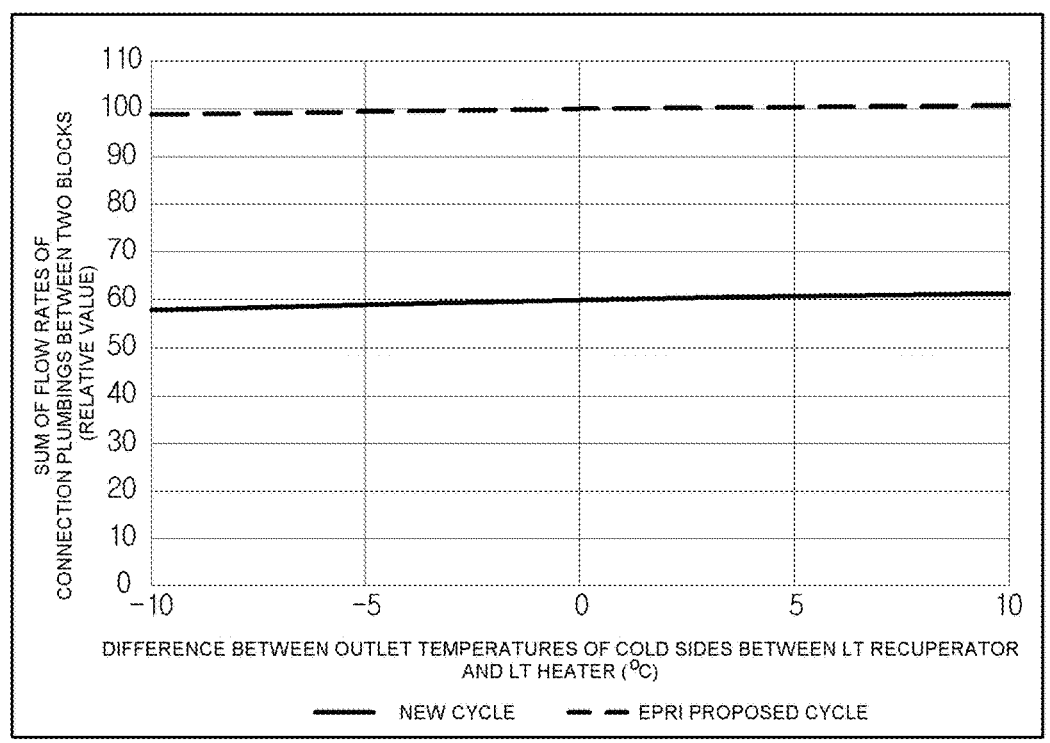
FIG. 6 is a comparison graph of a sum of flow rates of connection plumbings of the cycle of FIG. 1 and the cycle of FIG. 2.
Figure 7:
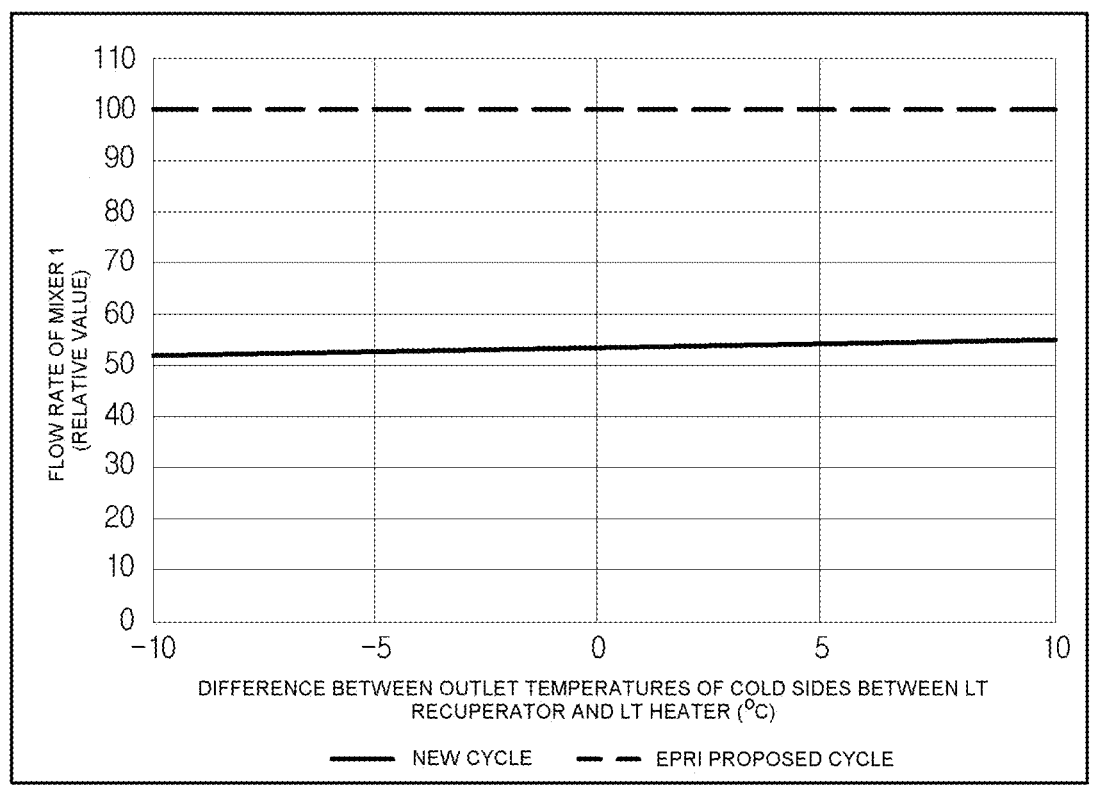
FIG. 7 is a comparison graph of flow rates of first mixers of the cycle of FIG. 1 and the cycle of FIG. 2.

FIG. 3 is a comparison graph of temperature characteristics of a cycle of FIG. 1 and a cycle of FIG. 2. FIG. 4 is a comparison graph of net power of the cycle of FIG. 1 and the cycle of FIG. 2. FIG. 5 is a comparison graph of inlet temperatures of low temperature turbines of the cycle of FIG. 1 and the cycle of FIG. 2. FIG. 6 is a comparison graph of a sum of flow rates of connection plumbings of the cycle of FIG. 1 and the cycle of FIG. 2. FIG. 7 is a comparison graph of flow rates of first mixers of the cycle of FIG. 1 and the cycle of FIG. 2.

As shown in FIG. 3, when delta t1 ($\Delta$ t1, the temperature difference in the cold side outlets between the low temperature recuperator and the low temperature heater, the temperature difference between transfer pipe 13 and transfer pipe 9) is changed, in the EPRI proposed cycle as shown in FIG. 1, delta t2 (temperature difference in the cold side inlets between the high temperature recuperator and the high temperature heater, the difference between temperature of transfer pipe 15 and temperature of transfer pipe 10) is always maintained to be 0° C. However, in the cycle of the present disclosure, the delta t2 may have a value other than 0° C. Accordingly, since the temperatures of the working fluids introduced into the high temperature recuperator 210a and the high temperature heater 310a are different (transfer pipes 10 and 15), it is possible to design a cycle in which the inlet temperature of the turbine is increased to increase the work of the turbine.

As shown in FIG. 4, the delta t1 is greater than or equal to 0° C., and as the value increases, the proposed cycle of the present disclosure is more superior in net power, compared to the existing EPRI proposed cycle. That is, the proposed cycle of the present disclosure can achieve a higher output in the capacity of the given external heat source, compared with the existing EPRI proposed cycle.

As shown in FIG. 5, as the design is implemented by increasing the delta t1, the inlet temperature of the low temperature turbine in the proposed cycle of the present disclosure is increased, compared to the EPRI proposed cycle, which leads to the increase in the net power.

A typical waste heat recovery generation system may be classified into a waste heat recovery heater block (portion connected from the external heat source to the high temperature and low temperature heaters) for recovering waste heat from the external heat source, a power block including the recuperator and the turbine (generation system portion other than the waste heat recovery block), in which these two blocks are installed at a physical distance. At this time, as the connection plumbing between the two blocks is getting simpler and smaller, the economical efficiency is increased. As shown in FIG. 6, the proposed cycle of the present disclosure can reduce the plumbing diameter because the sum of the flow rates of the connection plumbing between the two blocks is about 60% compared to the EPRI proposed cycle, thereby saving the plumbing costs.

Further, as shown in FIG. 7, since the proposed cycle of the present disclosure has about 50% to 60% of the flow rate of the working fluid introduced into the first mixer, compared to the EPRI proposed cycle, the first mixer and the plumbing before and after the first mixer can be relatively smaller than before. Accordingly, it is possible to save the plumbing related costs.

The supercritical $CO_2$ power generation system of the series recuperative type according to an exemplary embodiment can increase the inlet temperature of the turbine to increase the work of the turbine, thereby realizing the cycle design having the improved turbine efficiency. Further, the number and diameter of pipes connected to the heat exchanger using the external heat source can be reduced to reduce the plumbing related costs, thereby improving the economical efficiency.

The various exemplary embodiments described as above and shown in the drawings should not be interpreted as limiting the technical spirit of the present invention. The scope of the present disclosure is limited only by matters set forth in the claims and those skilled in the art can modify and change the technical subjects of the present invention in various forms.

What is claimed is:

1. A supercritical CO2 generation system, comprising:
a compressor configured to compress a working fluid;
a plurality of heat exchangers configured to heat the working fluid using a heat supplied from an external heat source:
a plurality of turbines driven by the working fluid;
a plurality of recuperators configured to exchange heat between the working fluid having passed through the plurality of turbines and the working fluid having passed through the compressor to thereby cool the working fluid having passed through the plurality of turbines, wherein the plurality of recuperators are installed in series with each other; and
a pre-cooler configured to cool the working fluid primarily cooled by the plurality of recuperators, and supply the pre-cooled working fluid to the compressor,
wherein temperatures of the working fluids respectively introduced into the plurality of turbines are different from each other,
wherein the supercritical CO2 generation system further comprises a mixer configured to mix the working fluid heated by a cold side heat exchanger among the plurality of heat exchangers after having passed through the compressor and having been branched to the cold side heat exchanger with the working fluid having been branched from a cold side recuperator among the plurality of recuperators into the mixer after having passed through the cold side recuperator, such that the working fluid heated by, and having passing through, the cold side heat exchanger is supplied to a hot side heat exchanger among the plurality of heat exchangers without branching required for being supplied to the hot side heat exchanger, wherein the mixer is installed at a downstream end of a separator such that the working fluid, which has passed through the cold side heat exchanger, is mixed with the working fluid, which is branched from the separator after having passed through the cold side recuperator, wherein the separator is disposed at a downstream end of the cold side recuperator, and configured to respectively branch the working fluid heated via the cold side recuperator to (i) a hot side recuperator among the plurality of recuperators and (ii) the mixer such that the working fluid mixed at the mixer is supplied to the hot side heat exchanger, wherein the working fluid branched to the cold side recuperator is heated via the cold side recuperator and then branched to the hot side recuperator among the plurality of recuperators and the hot side heat exchanger among the plurality of heat exchangers, wherein the working fluid branched to the hot side heat exchanger is mixed with the working fluid heated by the cold side heat exchanger to be supplied to the hot side heat exchanger and reheated, and is then supplied to a hot side turbine among the plurality of turbines, wherein the working fluid branched to the hot side recuperator is heated via the hot side recuperator and then supplied to a cold side turbine among the plurality of turbines.

2. The supercritical CO2 generation system of claim 1, wherein the working fluid having passed through the compressor is branched to the cold side heat exchanger among the plurality of heat exchangers and the cold side recuperator among the plurality of recuperators from a downstream end of the compressor, respectively.

3. The supercritical CO2 generation system of claim 1, wherein a flow rate of the working fluid supplied to the hot side turbine via the hot side heat exchanger is set to be larger than that of the working fluid supplied to the cold side turbine via the hot side recuperator.

4. The supercritical CO2 generation system of claim 3, wherein the working fluid supplied to the hot side turbine is transmitted to the hot side recuperator after the hot side turbine is driven and exchanges heat with the working fluid supplied to the hot side recuperator via the compressor to be primarily cooled.

5. The supercritical CO2 generation system of claim 4, wherein the working fluid cooled by the hot side recuperator is mixed with the working fluid via the cold side turbine to be supplied to the cold side recuperator.

6. The supercritical CO2 generation system of claim 5, wherein the working fluid supplied to the cold side recuperator via the hot side recuperator exchanges heat with the working fluid via the compressor to be secondarily cooled, and the working fluid cooled by the cold side recuperator is supplied to the pre-cooler.

7. The supercritical CO2 generation system of claim 1, wherein the flow rate of the working fluid supplied to the hot side turbine via the hot side heat exchanger is 50% to 60% of a total flow rate of the working fluid having passed through the compressor.

8. A supercritical CO2 generation system, comprising:
a compressor configured to compress a working fluid;
a high temperature heater and a low temperature heater configured to heat the working fluid using a heat supplied from an external heat source;
a high temperature turbine and a low temperature turbine driven by the working fluid;
a plurality of recuperators configured to exchange heat between (i) the working fluid having passed through the high temperature turbine and the low temperature turbine and (ii) the working fluid having passed through the compressor to thereby cool the working fluid having passed through the high temperature turbine and the low temperature turbine, wherein the plurality of recuperators are installed in series with each other; and
a pre-cooler cooling the working fluid primarily cooled by the plurality of recuperators and supplying the pre-cooled working fluid to the compressor,
wherein the temperatures of the working fluids introduced into the high temperature turbine and the low temperature turbine are different from each other,
wherein the supercritical CO2 generation system further comprises a first mixer configured to mix the working fluid heated by the low temperature heater after having passed through the compressor and having been branched to the low temperature heater with the working fluid having been branched from a low temperature recuperator among the plurality of recuperators into the first mixer after having passed through the low temperature recuperator, such that the working fluid heated by, and having passing through, the low temperature heater is supplied to the high temperature heater without branching required for being supplied to the high temperature heater,
wherein the first mixer is installed at a downstream end of a second separator such that the working fluid, which has passed through the low temperature heater, is mixed with the working fluid, which is branched from the second separator after having passed through the low temperature recuperator,
wherein the second separator is disposed at a downstream end of the low temperature recuperator, and configured to respectively branch the working fluid heated via the low temperature recuperator to (i) a high temperature recuperator among the plurality of recuperators and (ii) the first mixer such that the working fluid mixed at the first mixer is supplied to the high temperature heater,
wherein the working fluid having passed through the high temperature turbine is cooled by sequentially having passed through the high temperature recuperator and the low temperature recuperator and then supplied to the pre-cooler,
wherein a downstream end of the compressor is provided with a first separator, and the working fluid having passed through the compressor is branched to the low temperature heater and the low temperature recuperator, respectively,
wherein a downstream end of the low temperature heater is provided with the first mixer, and the working fluid branched to the low temperature heater is primarily heated by the low temperature heater and is then mixed with the working fluid from the low temperature recuperator by the first mixer, and
wherein the working fluid mixed by the first mixer is reheated by the high temperature heater to be supplied to the high temperature turbine.

9. The supercritical COz2 generation system of claim 8, wherein the working fluid branched from the second separator to the high temperature recuperator is secondarily heated by the high temperature recuperator and then supplied to the low temperature turbine.

10. The supercritical COz generation system of claim 9, wherein a second mixer is provided between the high temperature recuperator and the low temperature recuperator, and the working fluid via the high temperature turbine exchanges heat with the working fluid via the second separator from the high temperature recuperator to be primarily cooled and then supplied to the second mixer.

11. The supercritical CO2 generation system of claim 10, wherein the working fluid having passed through the low temperature turbine is mixed with the working fluid having passed through the high temperature recuperator by the second mixer, supplied to the low temperature recuperator, and exchanges heat with the working fluid having passed through the first separator to be secondarily cooled and is then supplied to the pre-cooler.

12. The supercritical CO2 generation system of claim 8, wherein a flow rate of the working fluid mixed by the first mixer to be supplied to the high temperature heater is set to be larger than that of the working fluid branched to the high temperature recuperator and supplied to the low temperature turbine.

* * * * *